United States Patent
Hamano et al.

(10) Patent No.: US 9,407,813 B2
(45) Date of Patent: Aug. 2, 2016

(54) IMAGE CAPTURING APPARATUS, CONTROL METHOD OF IMAGE CAPTURING APPARATUS, AND IMAGE CAPTURING SYSTEM

(71) Applicant: CANON KABUSHIKI KAISHA, Tokyo (JP)

(72) Inventors: Hideyuki Hamano, Kawasaki (JP); Yumi Takao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/722,446

(22) Filed: May 27, 2015

(65) Prior Publication Data

US 2015/0350527 A1 Dec. 3, 2015

(30) Foreign Application Priority Data

Jun. 2, 2014 (JP) .................................. 2014-114371

(51) Int. Cl.
*G03B 13/00* (2006.01)
*H04N 5/232* (2006.01)
*H04N 1/21* (2006.01)

(52) U.S. Cl.
CPC ......... *H04N 5/23212* (2013.01); *H04N 1/2112* (2013.01)

(58) Field of Classification Search
CPC ... H04N 5/2312; H04N 5/2351; H04N 5/235; H04N 5/57; H04N 5/2393; G03B 7/36; G03B 13/36
USPC ................................................ 348/345–361
See application file for complete search history.

(56) References Cited

U.S. PATENT DOCUMENTS

| | | | | | |
|---|---|---|---|---|---|
| 2003/0189662 | A1* | 10/2003 | Matsuda | ............ | H04N 5/23212 348/345 |
| 2012/0274837 | A1* | 11/2012 | Yamasaki | .............. | G02B 7/285 348/360 |
| 2012/0300116 | A1* | 11/2012 | Nakamoto | ......... | H04N 5/23212 348/349 |
| 2013/0201385 | A1* | 8/2013 | Shukuin | ............. | H04N 5/23212 348/349 |

FOREIGN PATENT DOCUMENTS

| | | |
|---|---|---|
| JP | 2010-078810 A | 4/2010 |
| JP | 2010-117679 A | 5/2010 |
| JP | 5087077 B | 11/2012 |
| WO | 2009/028181 A1 | 3/2009 |

* cited by examiner

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

An image capturing apparatus comprises a focus detection unit configured to detect, based on a signal output from an image sensor, a focus evaluation value using one of a plurality of different focus detection methods, a correction unit configured to correct the focus evaluation value in accordance with the focus detection method used for the detection, and a storage unit configured to store information for calculating a reference correction value for correcting a focus evaluation value detected using a predetermined one of the focus detection methods, and information for calculating, from the reference correction value, a correction value for correcting a focus evaluation value detected using another of the focus detection methods. The correction unit calculates a correction value using the information stored in the storage unit, and corrects the focus evaluation value using the calculated correction value.

22 Claims, 10 Drawing Sheets

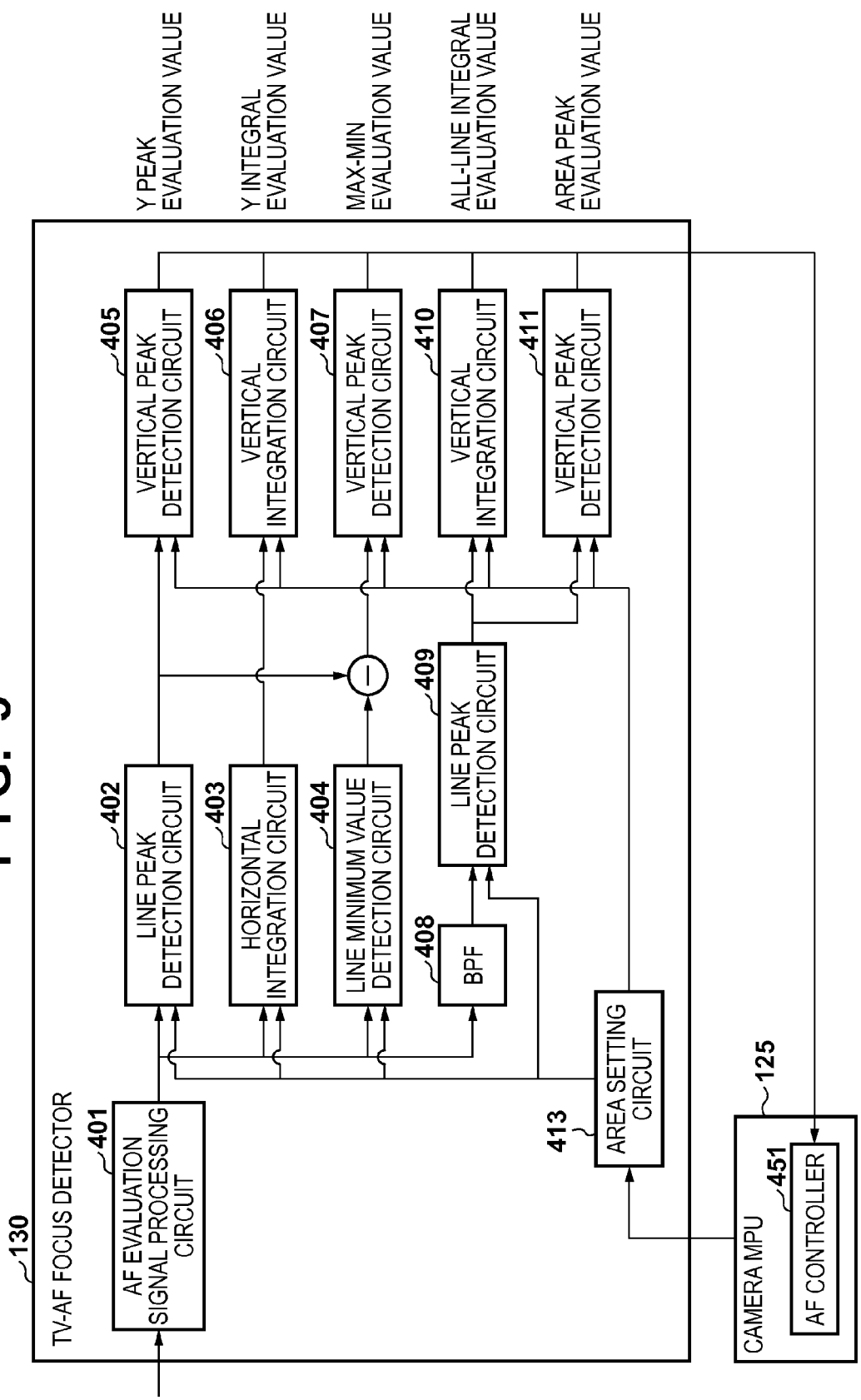

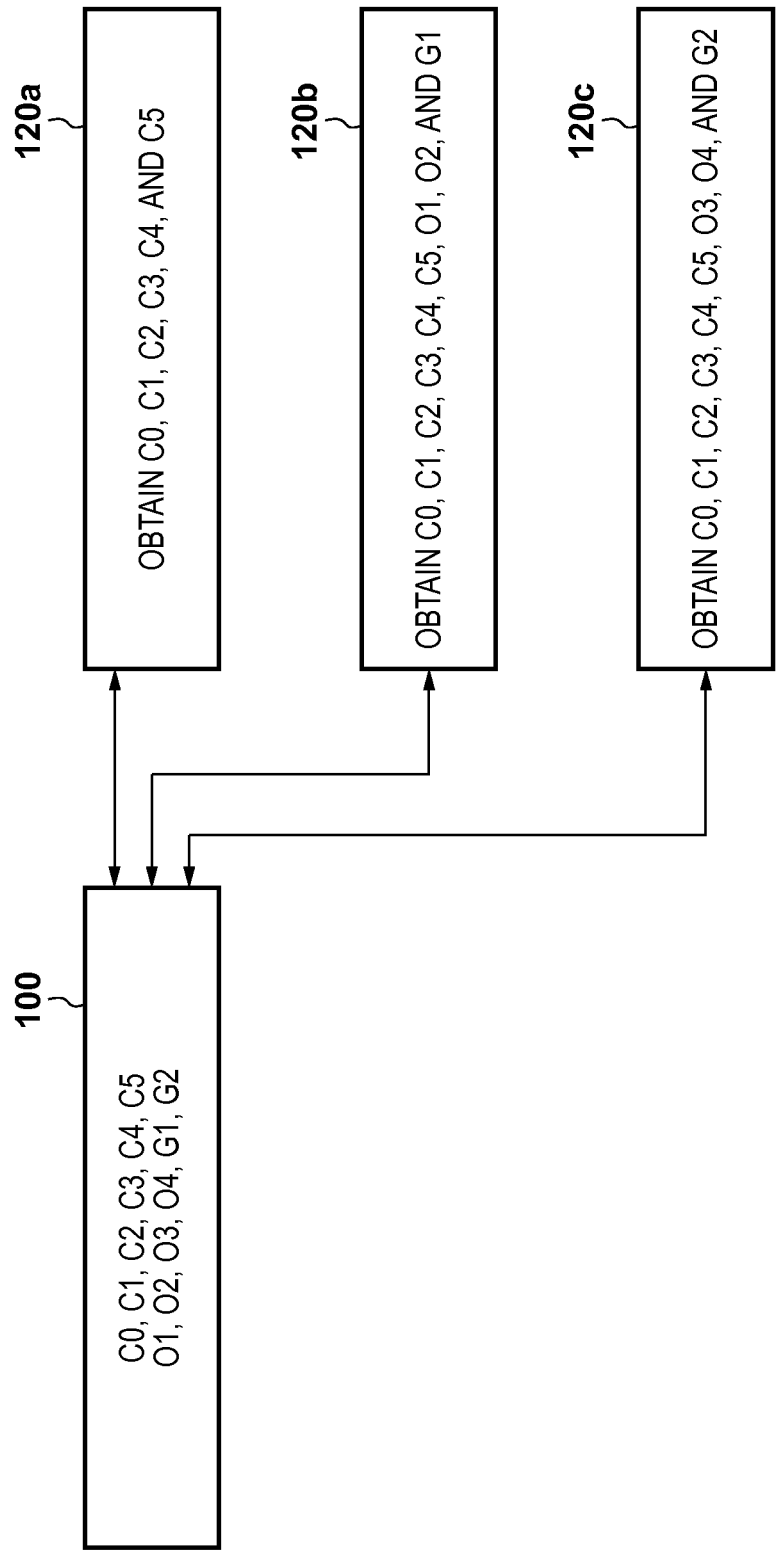

IMAGE CAPTURING APPARATUS, CONTROL METHOD OF IMAGE CAPTURING APPARATUS, AND IMAGE CAPTURING SYSTEM

BACKGROUND OF THE INVENTION

1. Field of the Invention

The present invention relates to an image capturing apparatus, a control method of the image capturing apparatus, and an image capturing system, and more specifically, to an image capturing apparatus having auto focus control function, a control method of the image capturing apparatus, and an image capturing system.

2. Description of the Related Art

Typical schemes of focus control methods for image capturing apparatuses include a contrast AF scheme and a phase difference AF scheme. The contrast AF scheme and the phase difference AF scheme are AF schemes widely used in video cameras and digital still cameras, with an image sensor being used as a focus detection sensor. In these focus control methods, focus detection results may contain errors due to various aberrations of an optical system. Various methods have been proposed to reduce such errors.

For example, Japanese Patent No. 5087077 discloses a method of calculating a correction value for correcting a focus detection result in accordance with a frequency band for evaluation of a signal used for focus detection. Regardless of the above-mentioned focus control methods, such a focus detection error occurs depending on, for example, a frequency band for evaluation of a focus control signal used in the contrast AF scheme or the phase difference AF scheme.

With the structure described in Japanese Patent No. 5087077, however, when the number of kinds of signals used for focus detection is larger, more correction values are needed. This requires more memory to store the correction values, leading to an increase in cost. Especially in the case of an image capturing apparatus having auto focus control function to which an interchangeable imaging lens unit can be attached, the imaging lens unit needs to store correction values corresponding to different focus detection functions or different focus detection methods, and the need for more memory leads to an increase in cost of the imaging lens unit.

SUMMARY OF THE INVENTION

The present invention has been made in consideration of the above situation, and prevents an increase in memory capacity required for storing correction values without loss of accuracy in correcting focus detection results in an image capturing apparatus.

According to the present invention, provided is an image capturing apparatus comprising: a focus detection unit configured to detect, based on a signal output from an image sensor, a focus evaluation value for controlling an imaging optical system to be in an in-focus state using one of a plurality of different focus detection methods; a correction unit configured to correct the focus evaluation value in accordance with the focus detection method used for the detection; and a storage unit configured to store information for calculating a reference correction value for correcting a focus evaluation value detected using a predetermined focus detection method from among the plurality of different focus detection methods, and information for calculating, from the reference correction value, a correction value for correcting a focus evaluation value detected using a focus detection method other than the predetermined focus detection method from among the plurality of different focus detection methods, wherein the correction unit is configured to calculate a correction value for correcting the focus evaluation value using the information stored in the storage unit, and correct the focus evaluation value using the calculated correction value.

Further, according to the present invention, provided is an image capturing apparatus comprising: an image sensor readable at different resolutions; a focus detection unit configured to detect, based on a signal output from the image sensor, a focus evaluation value for controlling an imaging optical system to be in an in-focus state using one of a plurality of different focus detection methods; a correction unit configured to correct the focus evaluation value in accordance with a combination of a resolution during image capturing and the focus detection method used for the detection; and a storage unit configured to store information for calculating a reference correction value for correcting a focus evaluation value detected using a predetermined combination from among a plurality of combinations of the different resolutions and the plurality of different focus detection methods, and information for calculating, from the reference correction value, a correction value for correcting a focus evaluation value detected using a combination other than the predetermined combination from among the plurality of combinations of the different resolutions and the plurality of different focus detection methods, wherein the correction unit is configured to calculate a correction value for correcting the focus evaluation value using the information stored in the storage unit, and correct the focus evaluation value using the calculated correction value.

Furthermore, according to the present invention, provided is an image capturing system comprising an imaging optical system and an image capturing apparatus, wherein the image capturing apparatus includes: a focus detection unit configured to detect, based on a signal output from an image sensor, a focus evaluation value for controlling the imaging optical system to be in an in-focus state; and a correction unit configured to correct the focus evaluation value in accordance with a focus detection method used for the detection, the imaging optical system includes a storage unit configured to store information for calculating a reference correction value for correcting a focus evaluation value detected using a predetermined focus detection method from among a plurality of different focus detection methods, and information for calculating, from the reference correction value, a correction value for correcting a focus evaluation value detected using a focus detection method other than the predetermined focus detection method from among the plurality of different focus detection methods, wherein the imaging optical system outputs, from among the information stored in the storage unit, information corresponding to the focus detection method used for the detection by the focus detection unit, to the image capturing apparatus, and the correction unit is configured to calculate a correction value for correcting the focus evaluation value using the information output from the imaging optical system, and correct the focus evaluation value using the calculated correction value.

Further, according to the present invention, provided is an image capturing system comprising an imaging optical system and an image capturing apparatus, wherein the image capturing apparatus includes: an image sensor readable at different resolutions; a focus detection unit configured to detect, based on a signal output from the image sensor, a focus evaluation value for controlling the imaging optical system to be in an in-focus state; and a correction unit configured to correct the focus evaluation value in accordance with a resolution during image capturing and a focus detection method used for the detection, the imaging optical system includes a storage unit configured to store information for calculating a reference correction value for correcting a focus evaluation value detected using a predetermined combination from among a plurality of combinations of different resolutions and plurality of different focus detection methods, and information for calculating, from the reference correction value, a correction value for correcting a focus evaluation value detected using a combination other than the predetermined combination from among the plurality of combinations of different resolutions and plurality of different focus detection methods, wherein the imaging optical system outputs, from among the information stored in the storage unit, information corresponding to the combination used in the image capturing apparatus, to the image capturing apparatus, and the correction unit is configured to calculate a correction value for correcting the focus evaluation value using the information output from the imaging optical system, and correct the focus evaluation value using the calculated correction value.

Further, according to the present invention, provided is a control method of an image capturing apparatus, comprising: detecting, based on a signal output from an image sensor, a focus evaluation value for controlling an imaging optical system to be in an in-focus state using one of a plurality of different focus detection methods; obtaining information corresponding to the focus detection method used for the detection of the focus evaluation value from a storage unit storing information for calculating a reference correction value for correcting a focus evaluation value detected using a predetermined focus detection method from among the plurality of different focus detection methods and information for calculating, from the reference correction value, a correction value for correcting a focus evaluation value detected using a focus detection method other than the predetermined focus detection method from among the plurality of different focus detection methods; calculating a correction value for correcting the focus evaluation value using the obtained information; and correcting the detected focus evaluation value using the calculated correction value.

Further, according to the present invention, provided is a control method of an image capturing apparatus, comprising: detecting, based on a signal output from an image sensor readable at different resolutions, a focus evaluation value for controlling an imaging optical system to be in an in-focus state using one of a plurality of different focus detection methods; obtaining information corresponding to a combination used for the detection of the focus evaluation value from a storage unit storing information for calculating a reference correction value for correcting a focus evaluation value detected using a predetermined combination from among a plurality of combinations of the different resolutions and the plurality of different focus detection methods and information for calculating, from the reference correction value, a correction value for correcting a focus evaluation value detected using a combination other than the predetermined combination from among the plurality of combinations of the different resolutions and the plurality of different focus detection methods; calculating a correction value for correcting the focus evaluation value using the obtained information; and correcting the detected focus evaluation value using the calculated correction value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a block diagram mainly showing the structure of a TV-AF focus detector according to the embodiment;

FIG. 10 is a conceptual diagram showing information communication between a lens unit and a removable camera body in a second embodiment.

DESCRIPTION OF THE EMBODIMENTS

Exemplary embodiments of the present invention will be described in detail in accordance with the accompanying drawings.

First Embodiment

A first embodiment describes an example of applying the present invention to a single-lens reflex digital camera for which a lens is interchangeable.

Description of Structure of Image Capturing Apparatus

Figure 1:
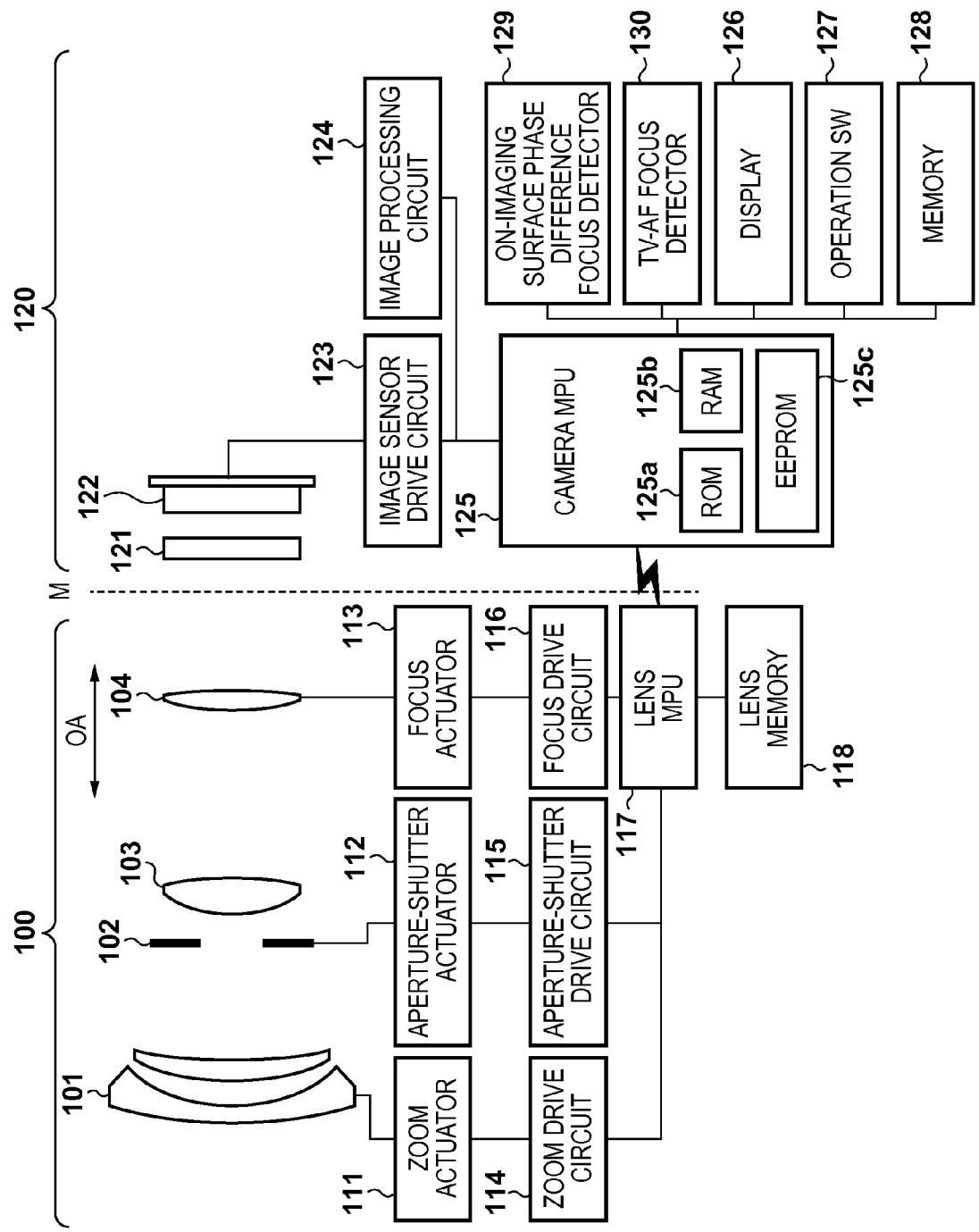
FIG. 1 is a block diagram schematically showing the structure of a digital camera according to an embodiment of the present invention.

FIG. 1 is a block diagram schematically showing the structure of the digital camera according to the first embodiment. As mentioned above, the digital camera in the first embodiment is an interchangeable lens type single-lens reflex camera, and includes a lens unit 100 and a camera body 120. The lens unit 100 is connected to the camera body 120 via a mount M indicated by the dotted line in the center of the drawing.

The lens unit 100 includes a first lens group 101, an aperture-shutter 102, a second lens group 103, a focus lens group (hereafter simply referred to as a "focus lens") 104, and a drive/control system. The lens unit 100 thus includes the focus lens 104 and the imaging lens unit for forming an image of a subject.

The first lens group 101 is located at the front end of the lens unit 100, and held to be movable forward and backward in an optical axis direction OA. The aperture-shutter 102 adjusts its aperture diameter to adjust the amount of light when capturing an image, and also functions as a shutter for exposure time adjustment when capturing a still image. The aperture-shutter 102 and the second lens group 103 integrally move forward and backward in the optical axis direction OA, to realize a zoom function together with the forward and backward movement of the first lens group 101. The focus lens 104 is also moved forward and backward in the optical axis direction OA to perform focus control.

The drive/control system includes a zoom actuator 111, an aperture-shutter actuator 112, a focus actuator 113, a zoom drive circuit 114, an aperture-shutter drive circuit 115, a focus drive circuit 116, a lens MPU 117, and a lens memory 118.

The zoom drive circuit 114, according to a zoom operation by a photographer, drives the zoom actuator 111 to drive the first lens group 101 and the second lens group 103 forward and backward in the optical axis direction OA, thus performing the zoom operation. The shutter drive circuit 115 drives/controls the aperture-shutter actuator 112 to control the aperture diameter of the aperture-shutter 102, thus adjusting the amount of light during image capturing and also controlling the exposure time during still image capturing. The focus drive circuit 116, based on a focus detection result, drives/controls the focus actuator 113 to drive the focus lens 104 forward and backward in the optical axis direction OA, thus performing focus control. The focus actuator 113 has a function of a position detector for detecting the current position of the focus lens 104.

The lens MPU 117 performs all computation and control relating to the lens unit 100, and controls the zoom drive circuit 114, the aperture-shutter drive circuit 115, the focus drive circuit 116, and the lens memory 118. The lens MPU 117 detects the current lens position, and provides lens position information in response to a request from a camera MPU 125. The lens position information includes information about the optical axial position of the focus lens 104, the optical axial position and diameter of an exit pupil in a state where the imaging optical system is not moving, and the optical axial position and diameter of a lens frame that limits the light flux of the exit pupil. The lens memory 118 stores optical information necessary for auto focus control.

The camera body 120 includes an optical low-pass filter (LPF) 121, an image sensor 122, and a drive/control system. The optical LPF 121 and the image sensor 122 function as an image sensing optical system for forming a subject image with a light beam from the lens unit 100. The first lens group 101, the aperture-shutter 102, the second lens group 103, the focus lens 104, and the optical LPF 121 constitute the above-mentioned imaging optical system.

The optical LPF 121 reduces false color and moire in a captured image. The image sensor 122 is composed of a CMOS sensor and its peripheral circuity, and has m pixels in the horizontal direction and n pixels in the vertical direction. The image sensor 122 includes pixels having photoelectric converters of the structure described later with reference to FIG. 2, and can output a pair of signals for performing the below-mentioned focus detection of the phase difference scheme (phase difference AF). Of the obtained signals, those to be used for phase difference AF are converted to focus detection image data by an image processing circuit 124. In addition, of the obtained signals, those to be used for display, recording, or focus detection of the contrast scheme are also transmitted to the image processing circuit 124 and subjected to predetermined processes depending on purpose.

The drive/control system includes an image sensor drive circuit 123, the image processing circuit 124, the camera MPU 125, a display 126, an operation switch group 127, a memory 128, an on-imaging surface phase difference focus detector 129, and a TV-AF focus detector 130.

The image sensor drive circuit 123 controls the operation of the image sensor 122, and also performs A/D conversion on an obtained image signal and transmits the converted image signal to the camera MPU 125 and the image processing circuit 124. The image processing circuit 124 performs γ conversion, color interpolation, JPEG compression, etc. on the image signal obtained by the image sensor 122.

The camera MPU (processor) 125 performs all computation and control relating to the camera body 120, and controls the image sensor drive circuit 123, the image processing circuit 124, the display 126, the operation SW 127, the memory 128, the on-imaging surface phase difference focus detector 129, and the TV-AF focus detector 130. The camera MPU 125 is connected to the lens MPU 117 via a signal line of the mount M, and issues, to the lens MPU 117, a request to obtain the lens position or a request to drive the lens by a predetermined drive amount, or obtain optical information unique to the lens unit 100. The camera MPU 125 includes a ROM 125a storing a program for controlling camera operation, a RAM 125b storing variables, and an EEPROM 125c storing various parameters.

The display 126 includes an LCD or the like, and displays information about the imaging mode of the camera, a preview image before image capturing and a confirmation image after image capturing, an in-focus state indication image upon focus detection, and the like. The operation switch group 127 includes a power switch, a release (imaging trigger) switch, a zoom operation switch, and an imaging mode selection switch. The memory 128 in the first embodiment is a removable memory such as flash memory, and records captured images.

The on-imaging surface phase difference focus detector 129 performs the focus detection process of the phase difference scheme (on-imaging surface phase difference AF) using the focus detection image data obtained by the image sensor 122 and the image processing circuit 124. In more detail, the on-imaging surface phase difference focus detector 129 performs on-imaging surface phase difference AF based on the deviation of a pair of images formed in focus detection pixels by a light beam passing through a pair of pupil areas of the imaging optical system. The method of on-imaging surface phase difference AF will be described in detail later.

The TV-AF focus detector 130 calculates various TV-AF evaluation values using contrast components of image information obtained by the image processing circuit 124, and performs the focus detection process of the contrast scheme (TV-AF). In the focus detection process of the contrast scheme, focus evaluation values at a plurality of focus lens positions are calculated while moving the focus lens 104, and a focus lens position corresponding to a peak focus evaluation value is detected.

Thus, in the first embodiment, on-imaging surface phase difference AF and TV-AF are both adopted, and can be used selectively or in combination depending on situation. The camera MPU 125 controls the position of the focus lens 104 using the focus detection result of each of on-imaging surface phase difference AF and TV-AF.

Description of Focus Detection

The following describes focus detection in the digital camera using signals of the image sensor 122 in detail. On-imaging surface phase difference AF and TV-AF are employed in the focus detection in the first embodiment. Each of the AF schemes is described first.

(Description of On-Imaging Surface Phase Difference AF)

Figure 2:
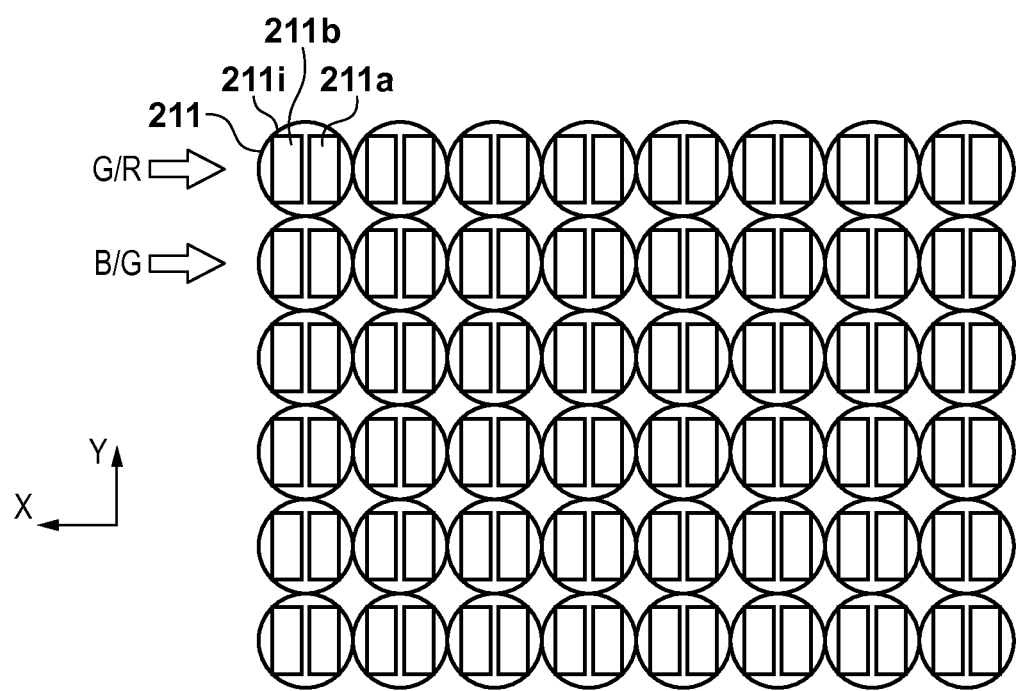
FIG. 2 is a plan view of light receiving pixels as seen from the lens unit side according to the embodiment.

On-imaging surface phase difference AF is described first with reference to FIGS. 2 to 4B. FIG. 2 is a diagram schematically showing a pixel array in the image sensor 122 in the first embodiment. FIG. 2 shows a two-dimensional CMOS area sensor in the range of 6 rows arranged in the vertical direction (direction Y) and 8 columns arranged in the horizontal direction (direction X), as seen from the lens unit 100 side. Color filters are put in a Bayer array. In pixels 211 of odd rows, green and red color filters are alternately arranged from left. In pixels 211 of even rows, blue and green color filters are alternately arranged from left. An on-chip microlens 211*i* is formed on each color filter. A plurality of rectangles inside the on-chip microlens 211*i* are photoelectric converters 211*a* and 211*b*.

In the first embodiment, the photoelectric converter of every pixel is split into two areas in the direction X, and a photoelectric conversion signal in one of the split areas and a sum of photoelectric conversion signals in the two areas can be read independently of each other. From the independently read signals, the difference between the sum of photoelectric conversion signals in the two areas and the photoelectric conversion signal in one of the split areas is calculated as a signal corresponding to a signal obtained in the other photoelectric conversion area. Such photoelectric conversion signals in the split areas are used as phase difference detection signals for phase difference AF by the below-mentioned method, and can also be used to generate a stereoscopic (3D) image made up of a plurality of images having parallax information. Meanwhile, the sum of photoelectric conversion signals in the two areas is used as a normal captured image.

Figure 3:
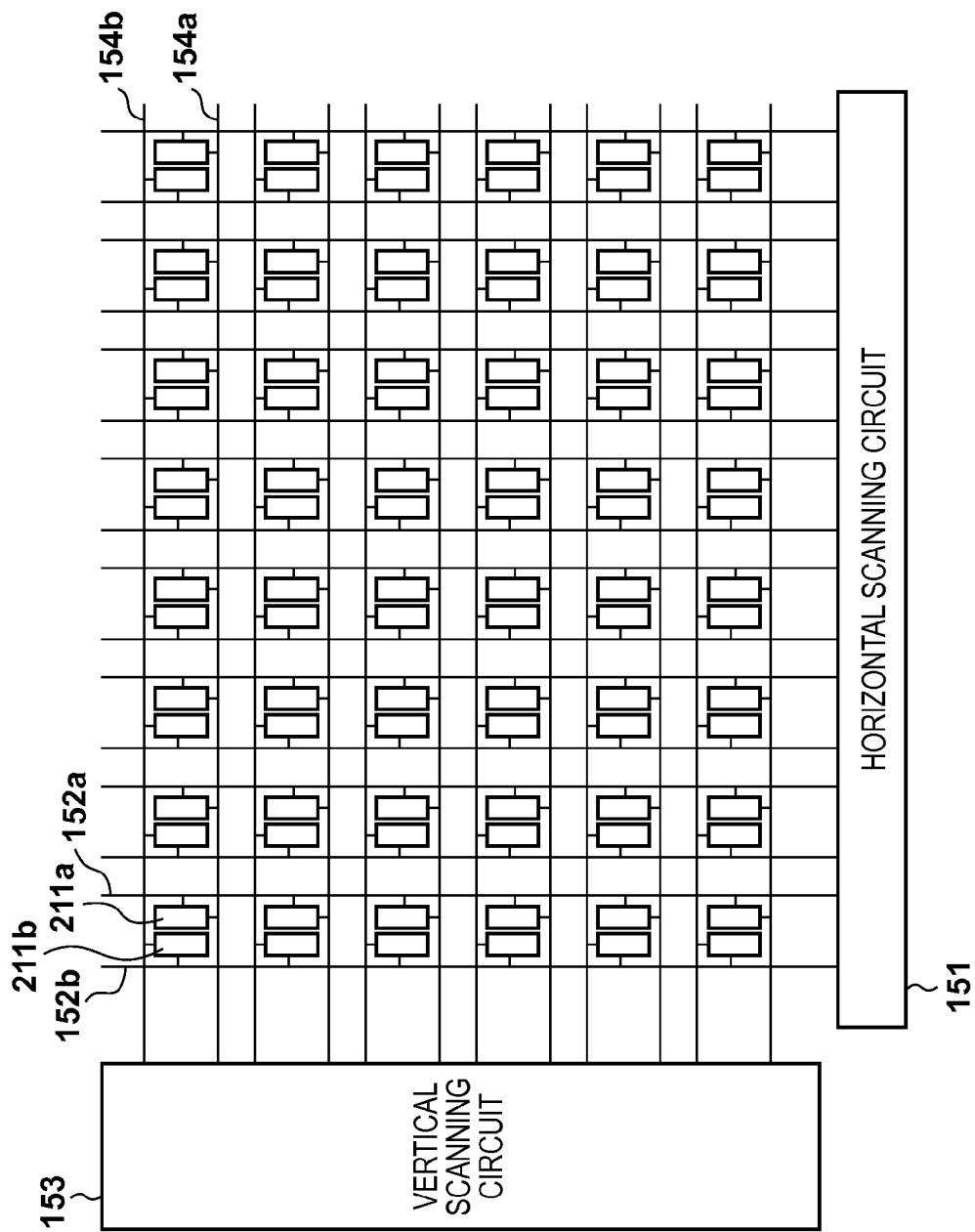
FIG. 3 is a diagram schematically showing the structure of an image sensor including a read circuit according to the embodiment.

FIG. 3 is a diagram schematically showing the structure of the image sensor 122 including a read circuit in the first embodiment. Reference numeral 151 indicates a horizontal scanning circuit, and 153 indicates a vertical scanning circuit. Vertical scan lines 152*a* and 152*b* and horizontal scan lines 154*a* and 154*b* are arranged at the boundaries of the pixels, and signals are read out from the photoelectric converters 211*a* and 211*b* via these scan lines.

The image sensor 122 in the first embodiment can be driven in the following two types of read modes that differ in resolution. The first read mode is all-pixel read mode which is a mode for capturing a high-resolution still image. The signals of all pixels are read in this case.

The second read mode is decimation read mode which is a mode for recording a moving image or displaying only a preview image. Since the number of pixels necessary in this case is smaller than the number of all pixels, signals are read only from pixels as a result of decimating pixels by a predetermined ratio in both of the directions X and Y. The decimation read mode is equally used in the case where high-speed reading is required. In the case of decimation in the direction X, signals are added to improve the S/N. In the case of decimation in the direction Y, signal outputs from rows to be decimated are ignored. The focus detection in the phase difference scheme and the contrast scheme is typically performed in the second read mode. In the case where more accurate focus detection is required or a live view display is enlarged, however, focus detection or live view display is performed in the first read mode.

Figure 4A:
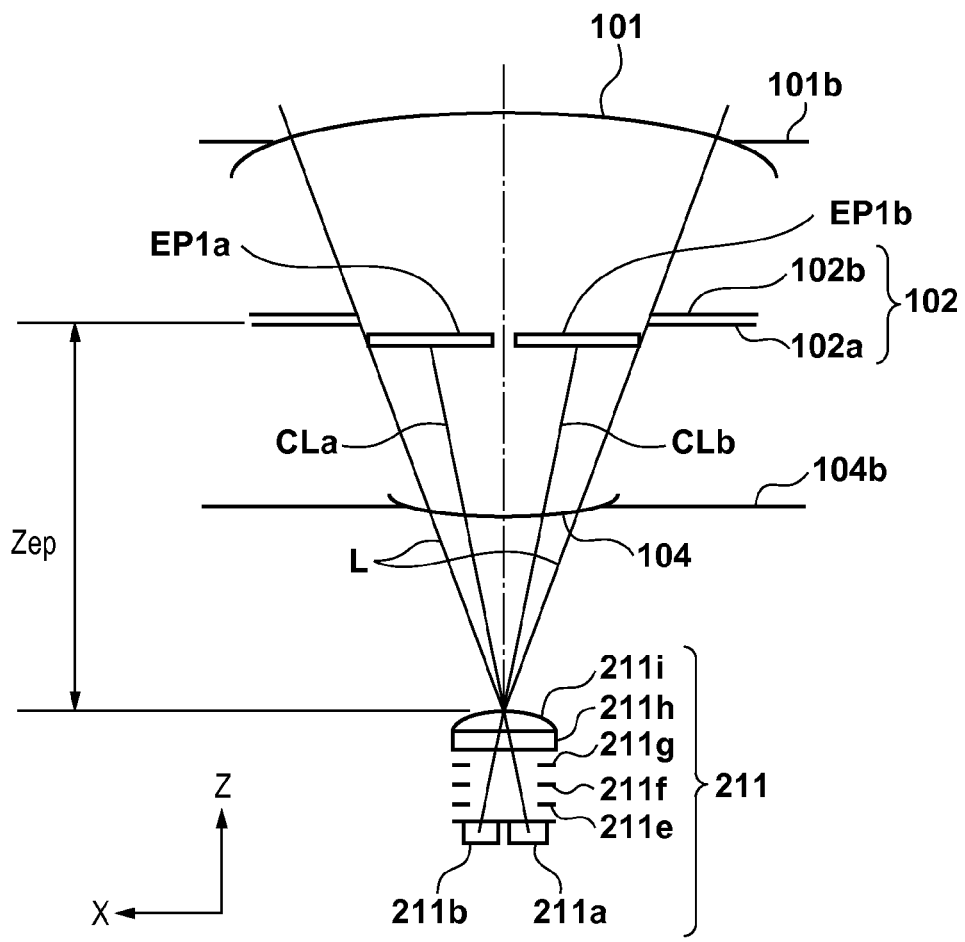
FIGS. 4A and 4B are diagrams for describing the conjugate relation between an exit pupil plane of an imaging optical system and photoelectric converters of a pixel located around the center of an imaging plane according to the embodiment.
Figure 4B:
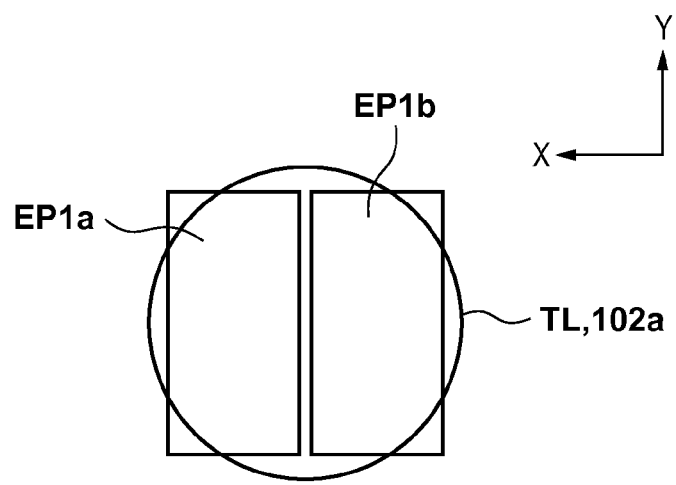

FIGS. 4A and 4B are diagrams for describing the conjugate relation between the exit pupil plane of the imaging optical system and the photoelectric converters of the pixel 211 at an image height of 0, i.e. located around the center of the imaging plane, in the image capturing apparatus in the first embodiment. The photoelectric converters 211*a* and 211*b* of the pixel 211 in the image sensor 122 and the exit pupil plane of the imaging optical system are designed to be in the conjugate relation by the on-chip microlens 211*i*. Typically, the exit pupil of the imaging optical system substantially matches a plane on which an iris diaphragm for adjusting the amount of light is placed. The imaging optical system in the first embodiment is a zoom lens having zoom function. Depending on the type of the imaging optical system, the distance of the exit pupil from the imaging plane or the size of the exit pupil changes when a zoom operation is performed. In the imaging optical system in FIGS. 4A and 4B, the focal length is intermediate between the wide angle end and the telephoto end, i.e. in the state of "middle". Assuming this as a standard exit pupil distance Zep, eccentric parameters corresponding to the image height (X, Y coordinates) and the shape of the on-chip microlens are designed optimally.

In FIG. 4A, a tube member 101*b* holds the first lens group, and a tube member 104*b* holds the focus lens 104. The aperture-shutter 102 has an aperture plate 102*a* for defining the aperture diameter in a full open state, and an aperture blade 102*b* for adjusting the aperture diameter during closing. The tube member 101*b*, the aperture plate 102*a*, the aperture blade 102*b*, and the tube member 104*b* which function as the member for limiting the light beam passing through the imaging optical system show an optical virtual image as observed from the imaging plane. Moreover, a synthetic aperture near the aperture-shutter 102 is defined as the exit pupil of the lens, and the distance from the imaging plane is defined as Zep as mentioned above.

In FIG. 4A, the pixel 211 for photoelectrically converting the subject image is located around the center of the imaging plane, which is hereafter referred to as a center pixel. The center pixel 211 is composed of the following members from the lowest layer: the photoelectric converters 211*a* and 211*b*; wiring layers 211*e* to 211*g*; a color filter 211*h*; and the on-chip microlens 211*i*. The two photoelectric converters 211*a* and 211*b* are projected on the exit pupil plane of the imaging optical system by the on-chip microlens 211*i*. In other words, the exit pupil of the imaging optical system is projected on the surfaces of the photoelectric converters 211*a* and 211*b* through the on-chip microlens 211*i*.

FIG. 4B shows the projected images of the photoelectric converters 211*a* and 211*b* on the exit pupil plane of the imaging optical system. The projected images of the photoelectric converters 211*a* and 211*b* are EP1*a* and EP1*b*, respectively. In the first embodiment, the image sensor 122 can obtain the output of one of the two photoelectric converters 211*a* and 211*b* and the output of the sum of the two photoelectric converters 211*a* and 211*b*, as mentioned earlier. The output of the sum of the two photoelectric converters 211*a* and 211*b* corresponds to the result of photoelectrically converting the light beam passing through both of the areas of the projected images EP1*a* and EP1*b* which occupy substantially the whole pupil area of the imaging optical system.

In FIG. 4A, the light beam is regulated by the aperture plate 102*a* of the diaphragm as represented by the outermost part L of the light beam passing through the imaging optical system, and the projected images EP1*a* and EP1*b* have substantially no vignetting due to the imaging optical system. In FIG. 4B, the light beam in FIG. 4A is denoted by TL. Most of the projected images EP1*a* and EP1*b* of the photoelectric converters 211*a* and 211*b* are contained within the light beam TL indicated by the circle, which also demonstrates that substantially no vignetting occurs. Since the light beam is limited only by the aperture plate 102*a* of the diaphragm, the light beam TL is substantially equal to the aperture diameter of the aperture plate 102*a*. Here, the respective vignetting states of the projected images EP1*a* and EP1*b* are symmetric with respect to the optical axis in the center of the imaging plane, and the photoelectric converters 211*a* and 211*b* receive the same amount of light.

Thus, the microlens 211*i* and the split photoelectric converters 211*a* and 211*b* pupil-split the light beam exited from the lens unit 100. The result of concatenating and organizing the outputs of the photoelectric converters 211*a* in a plurality of pixels 211 of a predetermined range on the same row is denoted as an AF image A, and the result of concatenating and organizing the outputs of the photoelectric converters 211*b* in the plurality of pixels 211 of the predetermined range on the same row is denoted as an AF image B. As the signal of each of the AF images A and B, a pseudo luminance (Y) signal calculated by adding the outputs of green, red, blue, and green of the photoelectric converters 211a or 211b in the Bayer array is used here. Alternatively, the AF images A and B may be organized for each of the colors of red, blue, and green. By detecting the relative image deviation of such generated AF images A and B by correlation computation, it is possible to detect the focus deviation in the predetermined area, i.e. the defocus amount. In the first embodiment, though one of the AF images A and B is not output from the image sensor 122, the sum of the images A and B is output as mentioned above and so the signal of the one of the AF images A and B can be obtained from the difference between the output of the sum and the output of the other one of the AF images A and B.

As described above with reference to FIGS. 2 to 4B, the image sensor 122 includes pixels that receive light beams passed through the exit pupil being split, so that phase difference AF can be performed using the obtained signals.

Although the above describes the structure of splitting the exit pupil in the horizontal direction, pixels for splitting the exit pupil in the vertical direction may also be provided in the image sensor 122. The provision of pixels for splitting the exit pupil in both directions enables focus detection corresponding to the contrast of the subject in not only the horizontal direction but also the vertical direction. Further, although the above describes the case where two photoelectric converters split each of all pixels, the three or more photoelectric converters may split each pixel, and the photoelectric converters may split a part of the pixels if phase difference AF is only concerned.

(Description of TV-AF)

The following describes process flow of calculating various AF evaluation values for TV-AF. FIG. 5 is a block diagram mainly showing the structure of the TV-AF focus detector 130.

When a signal read from the image sensor 122 is input to the TV-AF focus detector 130, an AF evaluation signal processing circuit 401 extracts a green (G) signal from a Bayer array signal, and performs a gamma correction process of emphasizing low luminance components and suppressing high luminance components. Although the first embodiment describes the case where a green (G) signal is used in TV-AF, all signals of red (R), blue (B), and green (G) may be used. Moreover, a luminance (Y) signal may be generated using all colors of RGB. Hence, the output signal generated by the AF evaluation signal processing circuit 401 is hereafter referred to as the luminance signal Y, regardless of which color is used.

The following describes a method of calculating a Y peak evaluation value. The luminance signal Y gamma-corrected by the AF evaluation signal processing circuit 401 is input to a line peak detection circuit 402 for detecting a line peak value per horizontal line. The line peak detection circuit 402 detects a Y line peak value per horizontal line in each focus detection area set by an area setting circuit 413. The output of the line peak detection circuit 402 is input to a vertical peak detection circuit 405. The vertical peak detection circuit 405 performs peak hold in the vertical direction in each focus detection area set by the area setting circuit 413, to generate a Y peak evaluation value. The Y peak evaluation value is effective for determination of a high luminance subject or a low illuminance subject.

The following describes a method of calculating a Y integral evaluation value. The luminance signal Y gamma-corrected by the AF evaluation signal processing circuit 401 is input to a horizontal integration circuit 403 for detecting an integral value per horizontal line. The horizontal integration circuit 403 calculates the integral value of the luminance signal Y per horizontal line in each focus detection area set by the area setting circuit 413. The output of the horizontal integration circuit 403 is input to a vertical integration circuit 406. The vertical integration circuit 406 performs integration in the vertical direction in each focus detection area set by the area setting circuit 413, to generate a Y integral evaluation value. The Y integral evaluation value enables determination of the brightness of each focus detection area as a whole.

The following describes a method of calculating a max-min evaluation value. The luminance signal Y gamma-corrected by the AF evaluation signal processing circuit 401 is input to the line peak detection circuit 402, to detect the Y line peak value per horizontal line in each focus detection area. The gamma-corrected luminance signal Y is also input to a line minimum value detection circuit 404. The line minimum value detection circuit 404 detects the minimum value of the luminance signal Y per horizontal line in each focus detection area. The detected line peak value and minimum value of the luminance signal Y per horizontal line are input to a subtractor to calculate "(line peak value)−(minimum value)", and then the result is input to a vertical peak detection circuit 407. The vertical peak detection circuit 407 performs peak hold in the vertical direction in each focus detection area, to generate a max-min evaluation value. The max-min evaluation value is effective for determination of low contrast and high contrast.

The following describes a method of calculating an area peak evaluation value. The luminance signal Y gamma-corrected by the AF evaluation signal processing circuit 401 is input to a BPF 408 to extract a specific frequency component and generate a focus signal. The focus signal is input to a line peak detection circuit 409 for detecting a line peak value per horizontal line. The line peak detection circuit 409 detects a line peak value per horizontal line in each focus detection area. The detected line peak value is subjected to peak hold in each focus detection area by a vertical peak detection circuit 411, to generate an area peak evaluation value. The area peak evaluation value changes little even when the subject moves in each focus detection area, and so is effective to determine whether or not to shift from an in-focus state to a state for searching for an in-focus position again.

The following describes a method of calculating an all-line integral evaluation value. The line peak detection circuit 409 detects the line peak value per horizontal line in each focus detection area, as in the case of the area peak evaluation value. The line peak value is input to a vertical integration circuit 410, to perform integration for all the horizontal scan lines in the vertical direction in each focus detection area to generate an all-line integral evaluation value. The high-frequency all-line integral evaluation value has a wide dynamic range and high sensitivity because of the effect of integration, and so is effective as a main evaluation value of TV-AF for detecting an in-focus position. In the first embodiment, this all-line integral evaluation value that changes according to the defocus state and is used for focus control is referred to as a focus evaluation value.

The area setting circuit 413 generates a gate signal for each focus detection area for selecting a signal at a predetermined position in the screen set by the camera MPU 125. The gate signal is input to each of the line peak detection circuit 402, the horizontal integration circuit 403, the line minimum value detection circuit 404, the line peak detection circuit 409, the vertical peak detection circuits 405, 407, and 411, and the vertical integration circuits 406 and 410. The timing at which the luminance signal Y is input to each circuit is controlled so that each evaluation value is generated for the luminance signal Y in each focus detection area. The area setting circuit 413 can set a plurality of areas in accordance with each focus detection area.

An AF controller 451 in the camera MPU 125 receives each evaluation value obtained in the above-mentioned manner, and controls the focus actuator 113 via the focus drive circuit 116 to move the focus lens 104 in the optical axis direction OA, thus executing AF control.

In the first embodiment, each type of AF evaluation value is calculated not only in the horizontal line direction but also in the vertical line direction, as described above. This enables focus detection using contrast information of the subject in both the horizontal and vertical directions.

In TV-AF, each type of AF evaluation value mentioned above is calculated while driving the focus lens 104, and the focus lens position corresponding to the maximum all-line integral evaluation value is detected to perform focus detection.

Description of Focus Detection Area

Figure 6:
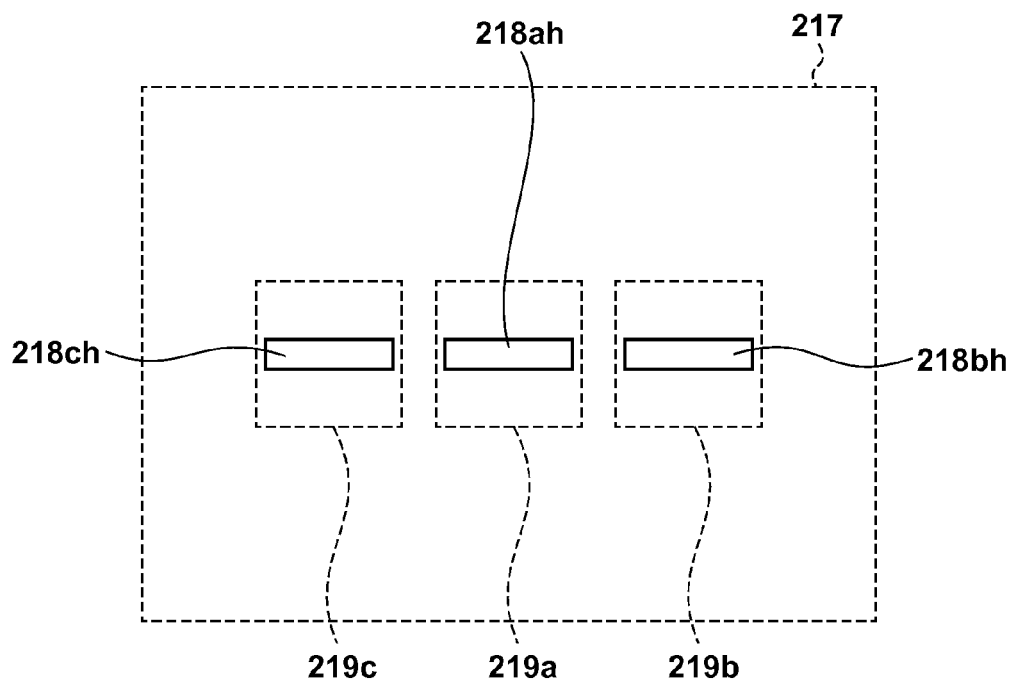
FIG. 6 is a diagram showing an example of focus detection areas according to the embodiment.

FIG. 6 is a diagram showing focus detection areas in an imaging range. On-imaging surface phase difference AF and TV-AF are performed in such a focus detection area based on a signal obtained from the image sensor 122. In FIG. 6, the dotted rectangle represents an imaging range 217 of the image sensor 122. Three horizontal focus detection areas 218ah, 218bh, and 218ch subjected to on-imaging surface phase difference AF are set in the imaging range 217. In the first embodiment, the focus detection areas for on-imaging surface phase difference AF are provided at a total of three locations, i.e. a center part and right and left parts of the imaging range 217. In addition, focus detection areas 219a, 219b, and 219c subjected to TV-AF are formed so as to respectively contain the three focus detection areas 218ah, 218bh, and 218ch for on-imaging surface phase difference AF. In each focus detection area subjected to TV-AF, contrast detection is performed using the focus evaluation values in the horizontal and vertical directions as described with reference to FIG. 5.

Although FIG. 6 shows an example where three focus detection areas are roughly provided, the present invention is not limited to three areas, and a plurality of areas may be provided at any positions. In the case where the photoelectric converters split a pixel in the direction Y, an area in which pixels are arranged in the vertical direction may be set as the focus detection area for on-imaging surface phase difference AF.

Description of Focus Detection Process Flow

Figure 7A:
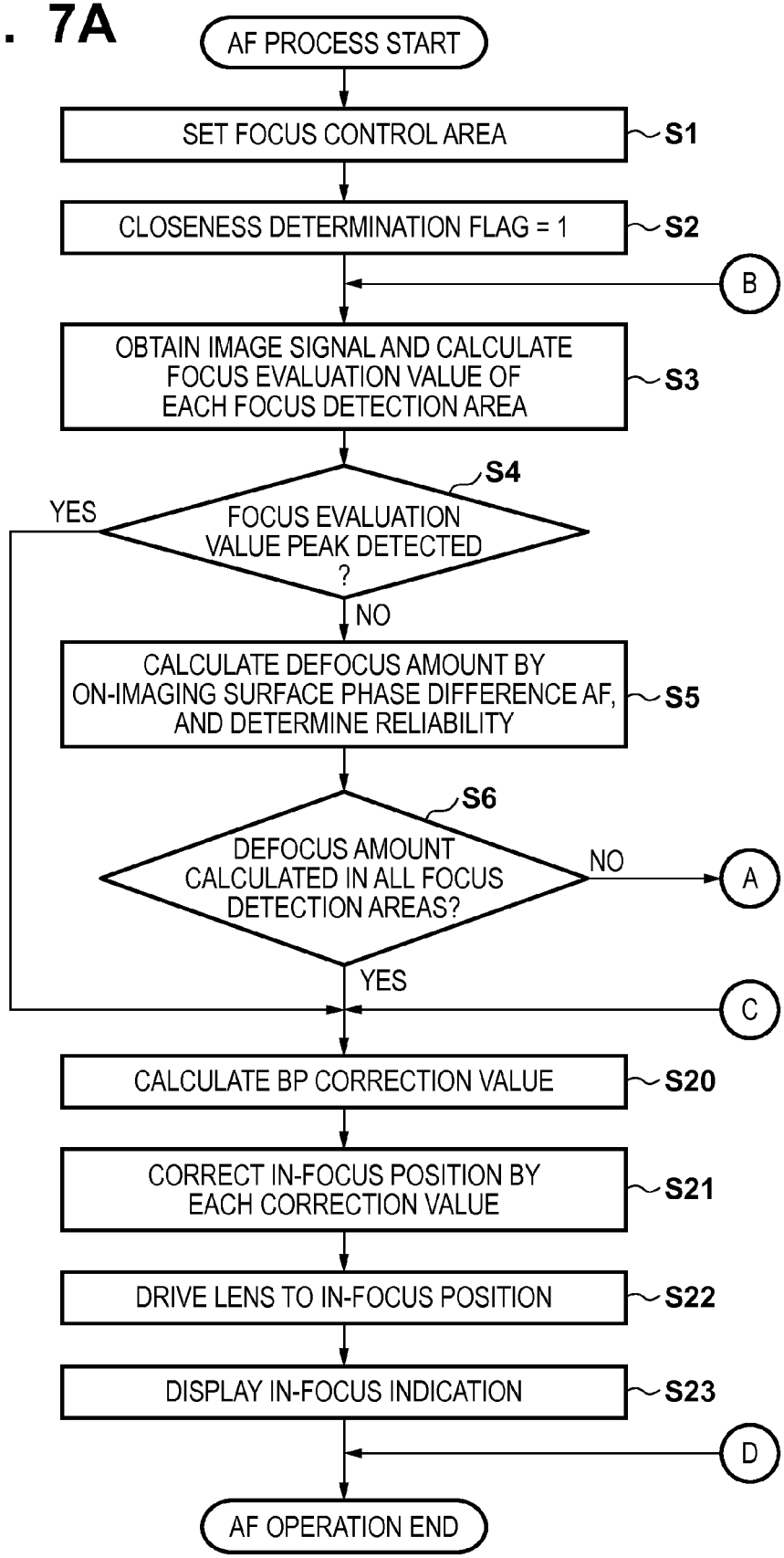
FIG. 7A is a flowchart showing an AF operation according to a first embodiment.
Figure 7B:
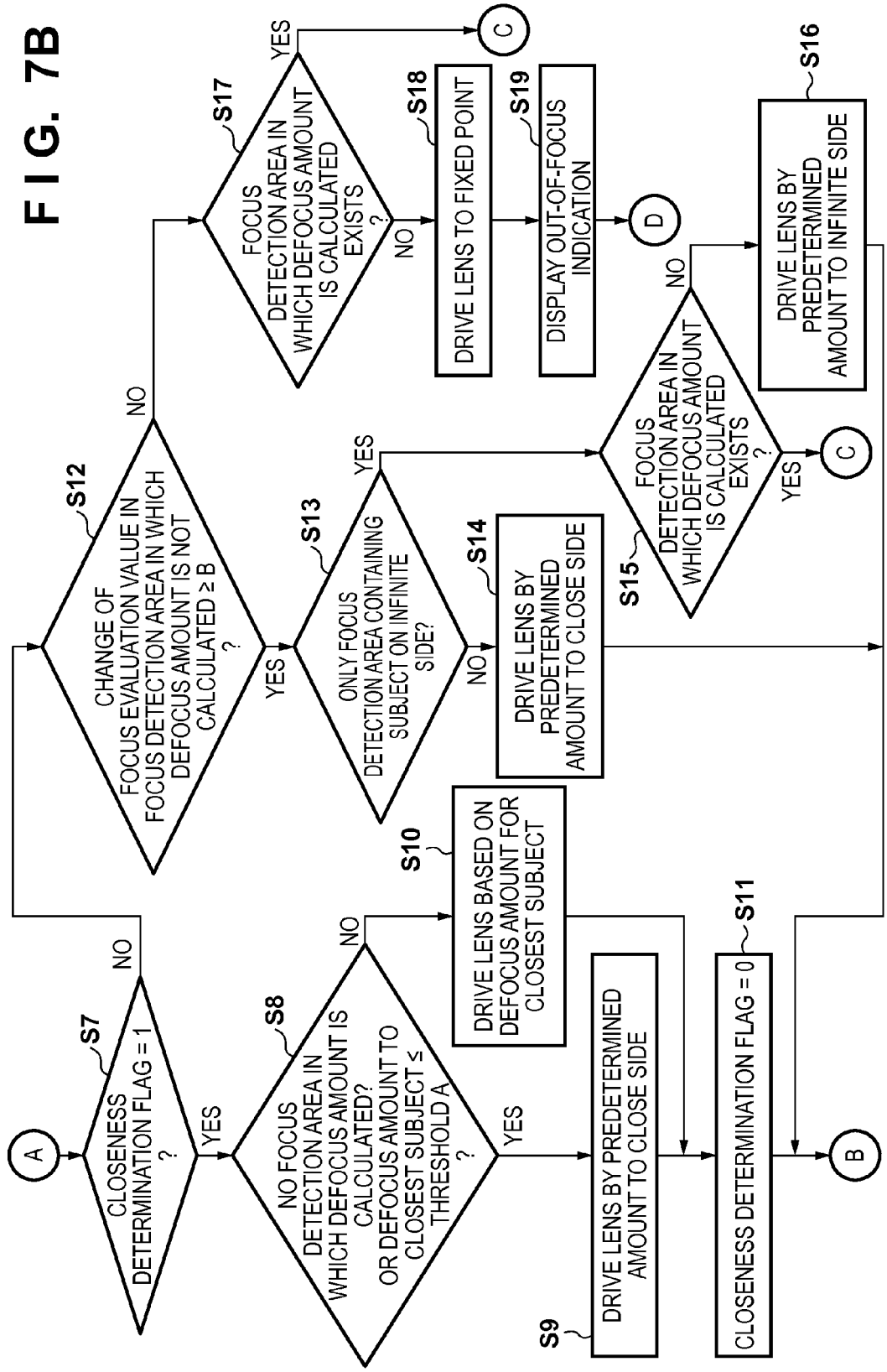
FIG. 7B is a flowchart showing the AF operation according to the first embodiment.

The following describes a focus detection (AF) process in the first embodiment in the digital camera having the above-mentioned structure, with reference to FIGS. 7A and 7B. The AF process in the first embodiment is roughly as follows. First, focus deviation (defocus amount) and reliability are calculated by phase difference AF, for each of the focus detection areas 218ah, 218bh, and 218ch. The areas are classified either as an area where a defocus amount having predetermined reliability is obtained or an area where such a defocus amount is not obtained. If the defocus amount having the predetermined reliability is obtained in all of the focus detection areas 218ah, 218bh, and 218ch, the focus lens 104 is driven to be in focus with the closest subject.

In the case where the defocus amount having the predetermined reliability is not obtained in at least one area, whether or not a subject is present on the closer side is determined for the corresponding area of the focus detection areas 219a to 219c, using the change in focus evaluation value before and after the focus lens is driven. In the case of determining that the subject is present on the closer side, the focus lens 104 is driven based on the change in focus evaluation value obtained by contrast AF. Here, if no focus evaluation value has been obtained previously, the change in focus evaluation value cannot be calculated. In such a case, when there is any area in which the defocus amount having the predetermined reliability greater than a predetermined defocus amount is obtained, the focus lens 104 is driven so as to be in focus with the closest subject from among the obtained defocus amounts. In other cases, that is, in the case where there is no area where the defocus amount having the predetermined reliability is obtained and in the case where the obtained defocus amount is not greater than a predetermined defocus amount, the lens is driven by a predetermined amount irrespective of the defocus amount. The reason that the lens is driven by the predetermined amount irrespective of the defocus amount in the case where the defocus amount is small is as follows: with the lens drive amount based on the defocus amount, there is a high possibility that the change of the focus evaluation value is hard to be detected in the next focus detection.

After the focus detection by one of the methods ends, the focus detection correction value is calculated based on the condition used during the focus detection, to correct the focus detection result. The focus lens 104 is then driven based on the corrected focus detection result, thus ending the focus control process.

The following describes the above-mentioned AF process in detail. FIGS. 7A and 7B are flowcharts showing the AF operation of the image capturing apparatus in the first embodiment. A control program relating to this operation is executed by the camera MPU 125. Having started the AF operation, the camera MPU 125 first sets each focus detection area for focus control on a subject in step S1. It is assumed herein that the three focus detection areas as shown in FIG. 5 are set as an example.

Next, in step S2, a closeness determination flag is set to 1. In step S3, signals necessary for focus detection are obtained in each focus detection area. In detail, after the image sensor 122 performs exposure, image signals of focus detection pixels in each of the focus detection areas 218ah, 218bh, and 218ch for on-imaging surface phase difference AF are obtained. The image signals obtained here may be subjected to the correction process described in Japanese Patent Laid-Open No. 2010-117679. Further, a pixel signal in each of the focus detection areas 219a, 219b, and 219c for TV-AF is obtained to calculate a focus evaluation value. The calculated focus evaluation value is stored in the RAM 125b.

Next, in step S4, whether or not the peak (maximum value) of the focus evaluation value is detected is determined. This is intended for the focus detection of the contrast scheme. In the case where the reliable peak is detected, the process advances to step S20 to end the focus detection. The reliability of the focus evaluation value may be determined using the method described with reference to FIGS. 10 to 13 in Japanese Patent Laid-Open No. 2010-078810.

In detail, whether or not the focus evaluation value indicating the in-focus state is in concave down form is determined from the difference between the maximum and minimum values of the focus evaluation value, the length of its part sloped by a predetermined value (SlopeThr) or more, and the gradient of the sloped part. The reliability of the peak can be determined in this way.

In the first embodiment, phase difference AF is used, too. Accordingly, in the case where the presence of a closer subject has been recognized in the same focus detection area or another focus detection area, even when a reliable focus evaluation value peak is detected, the process may advance to step S5 without ending the focus detection. In such a case, the position of the focus lens 104 corresponding to the position of the focus evaluation value peak is stored and, if a reliable focus detection result is not obtained subsequently, the stored position of the focus lens 104 is set as the focus detection result. Besides, since the peak cannot be detected from the first focus evaluation value calculation result alone, the process advances to step S5.

In step S5, for each of the focus detection areas 218ah, 218bh, and 218ch for on-imaging surface phase difference AF, the deviation (phase difference) of the obtained pair of image signals is calculated, and the defocus amount is calculated using a pre-stored conversion factor to the defocus amount. Here, the reliability of the calculated defocus amount is also determined, and only the defocus amount of the focus detection area determined to have the predetermined reliability is used in the subsequent AF process. Due to vignetting by the imaging lens unit, the deviation of the detected pair of image signals contains more error as the defocus amount increases. Therefore, in the case where the calculated defocus amount is large, the degree of consistency in form between the pair of image signals is low, or the contrast of the pair of image signals is low, it is determined that high-accuracy focus detection is impossible, i.e. the reliability of the calculated defocus amount is low. Hereafter, the case where the calculated defocus amount has the predetermined reliability is phrased as "the defocus amount is calculated", and the case where the defocus amount cannot be calculated for some reason or the reliability of the calculated defocus amount is low is phrased as "the defocus amount cannot be calculated".

Next, in step S6, whether or not the defocus amount can be calculated in all of the plurality of focus detection areas 218ah, 218bh, and 218ch set in step S1 is determined. In the case where the defocus amount can be calculated in all of the focus detection areas, the process advances to step S20, and a best point (BP) correction value is calculated for the focus detection area in which the defocus amount indicating the closest subject from among the calculated defocus amounts is calculated. The reason for selecting the closest subject is that, in general, the subject which the photographer wants to focus on tends to be present on the close side. The BP correction value is a value for correcting the difference between the in-focus position of an image to be recorded and the focus detection result.

The following three main factors are known to cause the difference between the in-focus position of the image to be recorded and the focus detection result. The first factor is the error (hereafter referred to as "spatial frequency BP") resulting from the difference between the spatial frequency band for evaluation of the in-focus state of the image to be recorded and the frequency band for evaluation of the focus detection signal. This error occurs in the case where the imaging optical system has spherical aberration. The second factor is the error (hereafter referred to as "color BP") resulting from the difference between the color for evaluation during viewing of the image to be recorded and the color used in the focus detection signal. This error occurs in the case where the imaging optical system has chromatic aberration. The third factor is the error (hereafter referred to as "vertical/horizontal BP") resulting from the difference between the contrast direction for evaluation during viewing of the image to be recorded and the contrast direction for evaluation of the focus detection signal. This error occurs in the case where the imaging optical system has astigmatism.

The correction value for correcting the error caused by the above-mentioned factors is the BP correction value. As is clear from the cause of occurrence, the correction amount differs depending on the aberration occurrence situation, and so the correction value corresponding to the property of the imaging optical system is necessary. The correction value according to the property of the focus detection signal is also necessary. In the first embodiment, the necessary correction amount differs depending on whether the focus detection is performed in the first read mode or the second read mode and whether on-imaging surface phase difference AF or TV-AF is performed. In the first embodiment, the BP correction values in the other cases are simply calculated from the BP correction value in the case of performing on-imaging surface phase difference AF in the second read mode, to reduce storage space for the BP correction values. The cost or computation load of the image capturing apparatus can thus be reduced. The method of calculating the BP correction value will be described in detail later.

Next, in step S21, the focus detection result DEF_B is corrected by the following expression (1) using the BP correction value calculated in step S20, to calculate DEF_A:

$$DEF\_A = DEF\_B + BP \qquad (1).$$

In step S22, the focus lens 104 is driven based on the corrected defocus amount DEF_A calculated using expression (1) (in-focus control).

Next, in step S23, an in-focus indication is displayed on the display 126 with respect to the focus detection area in which the defocus amount used for driving the focus lens 104 is calculated, thus ending the AF process.

In the case where the defocus amount cannot be calculated in at least one focus detection area in step S6, the process advances to step S7 in FIG. 7B. In step S7, whether or not the closeness determination flag is 1 is determined. The closeness determination flag is a flag that is 1 in the case where no lens drive operation has been performed from the start of the AF operation, and 0 in the case where at least one lens drive operation has been performed. In the case where the closeness determination flag is 1, the process advances to step S8.

In step S8, in the case where the defocus amount cannot be calculated in any of the focus detection areas or the defocus amount indicating the presence of the closest subject from among the calculated defocus amounts is less than or equal to a predetermined threshold A, the process advances to step S9. In step S9, the focus lens 104 is driven by a predetermined amount to the close side.

The reason for driving the focus lens 104 by the predetermined amount in the case where step S8 results in Yes is as follows. The case where the defocus amount cannot be calculated in any of the plurality of focus detection areas corresponds to the case where a subject to be focused on is currently not found. Accordingly, before determining that the in-focus operation is impossible, the lens is driven by the predetermined amount to check the presence of the subject to be focused on in all focus detection areas, thus enabling determination of the below-mentioned focus evaluation value change. On the other hand, the case where the defocus amount indicating the presence of the closest subject from among the calculated defocus amounts is less than or equal to the predetermined threshold A corresponds to the case where there is a focus detection area substantially in the in-focus state at that point in time. In such a situation, the lens is driven by the predetermined amount to confirm the possibility that the subject currently not detected at that point in time is present on the closer side in the focus detection area in which the defocus amount cannot be calculated, thus enabling determination of the below-mentioned focus evaluation value change. The lens drive amount used here may be set in view of the sensitivity of the focus movement amount on the image sensor surface with respect to the lens drive amount or the F value of the imaging optical system.

In the case where step S8 results in No, that is, in the case where the defocus amount indicating the presence of the closest subject from among the calculated defocus amounts is greater than the predetermined threshold A, the process advances to step S10. This is the case where there is the focus detection area in which the defocus amount is calculated but the focus detection area is not in the in-focus state. Hence, in step S10, the lens is driven based on the defocus amount indicating the presence of the closest subject from among the calculated defocus amounts.

After the lens is driven in step S9 or S10, the process advances to step S11 to set the closeness determination flag to 0, and then returns to step S3 in FIG. 7A.

In the case where the closeness determination flag is not 1 (i.e. the closeness determination flag is 0) in step S7, the process advances to step S12. In step S12, whether or not the focus evaluation value of the TV-AF focus detection area corresponding to the focus detection area in which the defocus amount cannot be calculated has changed by a predetermined threshold B or more before and after the lens is driven is determined. While the focus evaluation value may increase or decrease, whether or not the absolute value of the change of the focus evaluation value is not less than the predetermined threshold B is determined here.

The case where the absolute value of the change of the focus evaluation value is not less than the predetermined threshold B in step S12 means that, while the defocus amount cannot be calculated, the change of the blurring state of the subject can be detected based on the increase/decrease of the focus evaluation value. Thus, in the first embodiment, even in the case where the defocus amount according to on-imaging surface phase difference AF cannot be detected, the AF process is continued with the presence of the subject being determined based on the increase/decrease of the focus evaluation value. This enables focus control for a subject whose defocus amount is large and cannot be detected by on-imaging surface phase difference AF.

The predetermined threshold B used in the determination is changed according to the moving amount of the focus lens 104 (lens drive amount). In the case where the lens drive amount is large, a larger value is set as the threshold B. In the case where the lens drive amount is small, a smaller value is set as the threshold B. This is because, in the case where a subject is present, the amount of change of focus evaluation value increases with an increase in lens drive amount. The threshold B for each lens drive amount is stored in the EEPROM 125*c*.

In the case where the absolute value of the change of the focus evaluation value is not less than the predetermined threshold B, the process advances to step S13, to determine whether or not a focus detection area indicating the presence of a subject on the infinite side is the only focus detection area in which the change of the focus evaluation value is not less than the threshold. The case where the focus detection area indicates the presence of a subject on the infinite side corresponds to the case where the focus evaluation value decreases when the lens drive direction is the close direction or the focus evaluation value increases when the lens drive direction is the infinite direction.

In the case where the focus detection area indicating the presence of the subject on the infinite side is not the only focus detection area in which the change of the focus evaluation value is not less than the threshold B, the process advances to step S14, and the lens is driven by the predetermined amount to the close side. This is because the focus detection areas in which the change of the focus evaluation value is not less than the threshold B include a focus detection area indicating the presence of a subject on the close side. The reason for giving priority to the close side is as described above.

In the case where the focus detection area indicating the presence of the subject on the infinite side is the only focus detection area in which the change of the focus evaluation value is not less than the threshold B in step S13, the process advances to step S15. In step S15, whether or not there is a focus detection area in which a defocus amount is calculated is determined. In the case where there is the focus detection area in which the defocus amount is calculated (step S15: Yes), the result of on-imaging surface phase difference AF is given priority over the presence of the subject on the infinite side according to the focus evaluation value, and so the process advances to step S20 in FIG. 7A.

In the case where there is no focus detection area in which the defocus amount is calculated (step S15: No), the change of the focus evaluation value is the only information indicating the presence of the subject, and so the lens is driven by the predetermined amount to the infinite side using the information in step S16. After driving the lens by the predetermined amount to the infinite side, the process returns to step S3 in FIG. 7A.

The lens drive amount used in steps S14 and S16 may be determined based on the defocus amount detectable in on-imaging surface phase difference AF. While the detectable defocus amount differs depending on the subject, such a lens drive amount that does not cause the subject to be passed through undetected by the lens drive from the state where the focus detection is impossible is set beforehand.

In the case where the absolute value of the change of the focus evaluation value is less than the predetermined threshold B (step S12: No), the process advances to step S17. In step S17, whether or not there is a focus detection area in which a defocus amount is calculated is determined. In the case where there is no focus detection area in which the defocus amount is calculated, the process advances to step S18 to drive the lens to a predetermined fixed point, and then advances to step S19 to display an out-of-focus indication on the display 126, thus ending the AF process. This is the case where there is no focus detection area in which a defocus amount is calculated and also there is no focus detection area in which the focus evaluation value changes before and after lens drive. In such a case, no information indicating the presence of the subject is available, so that the AF process ends on the ground that focus control is impossible.

In the case where there is the focus detection area in which the defocus amount is calculated in step S17, the process advances to step S20 in FIG. 7A, and the detected defocus amount is corrected (step S21). In step S22, the focus lens 104 is driven to the in-focus position. After this, in step S23, an in-focus indication is displayed on the display 126, thus ending the AF process.

BP Correction Value Calculation Method

Figure 8:
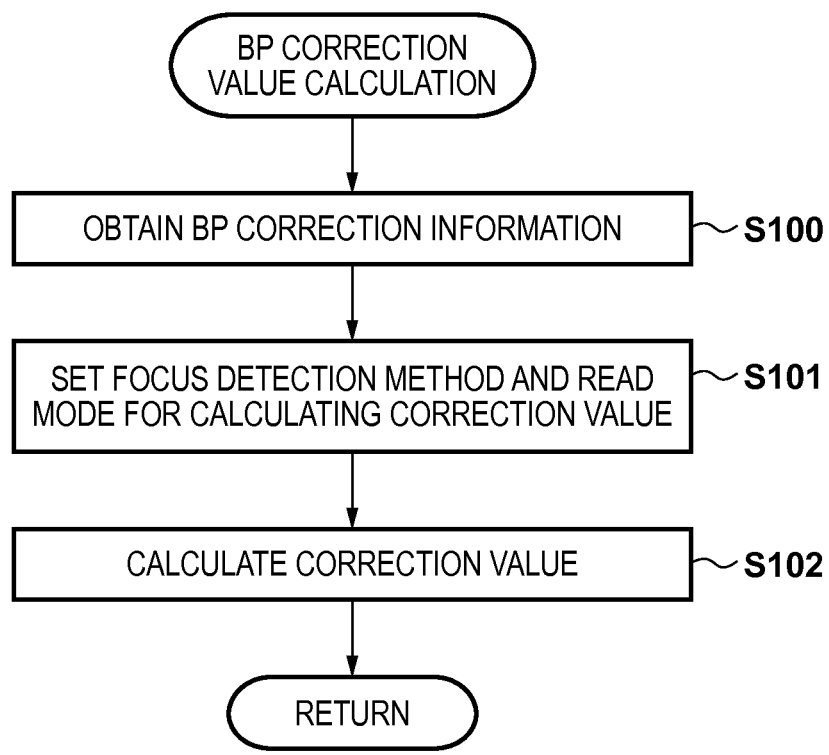
FIG. 8 is a flowchart showing an operation of calculating a BP correction value according to the first embodiment.
Figure 9:
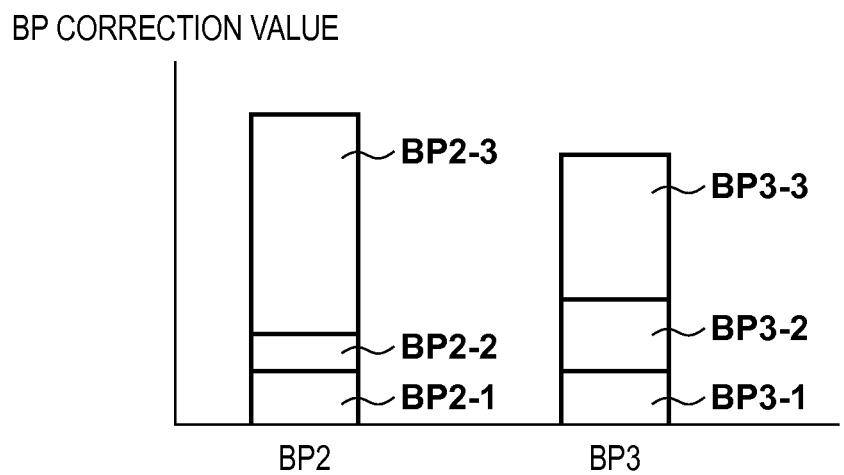
FIG. 9 is a diagram for describing a method of calculating a BP correction value according to the first embodiment.

The following describes the BP correction value calculation method performed in step S20 in FIG. 7A, with reference to FIGS. 8 and 9. FIG. 8 shows a subroutine of process flow for calculating the BP correction value, which is the detailed process in step S20 in FIG. 7A.

In step S100, BP correction information is obtained. The BP correction value which is the difference between the focus detection result and the in-focus position of the image to be recorded is different depending on the aberration situation of the imaging optical system or the property of the focus detection signal used, as mentioned above. The aberration property of the imaging optical system varies depending on the combination of (1) the focus control state S (focus state, zoom state) of the imaging optical system, (2) the aperture value F of the imaging optical system, (3) the exit pupil distance PD of the imaging optical system, etc. Meanwhile, the property of the focus detection signal varies depending on the combination of (4) the image height H of the image sensor in the focus detection area, (5) the set pupil distance D of the image sensor, (6) the pixel size P of the imaging pixel or focus detection pixel, etc.

In step S100, the focus control state S, aperture value F, and exit pupil distance PD of the imaging optical system are obtained via the lens MPU 117 as a part of the BP correction information, in response to a request by the camera MPU 125. Information of the set pupil distance D of the image sensor 122 and the pixel size P of the imaging pixel stored in the camera MPU 125 is also obtained as the other BP correction information.

In the first embodiment, the BP correction value is calculated using the above-mentioned variables indicating the aberration situation of the imaging optical system and variables indicating the property of the focus detection signal. In the first embodiment, the camera MPU 125 calculates the BP correction value, using variables that differ depending on the possible focus detection method and the read mode of the image sensor 122.

In step S101, the focus detection method and the read mode of the image sensor 122 when the reliable focus detection result is obtained as a result of the above-mentioned process of steps S1 to S17 are set. In the first embodiment, there are the following four cases.

Case (1): the focus detection of the on-imaging surface phase difference detection scheme in the first read mode.

Case (2): the focus detection of the on-imaging surface phase difference detection scheme in the second read mode.

Case (3): the focus detection of the contrast scheme in the first read mode.

Case (4): the focus detection of the contrast scheme in the second read mode.

In step S101, one of the above-mentioned four cases that is used for the currently obtained focus detection result is set.

Next, in step S102, the BP correction value according to the state set in step S101 is calculated. The correction value calculation method is described in detail below. In the same aberration situation of the imaging optical system, the absolute value of the BP correction value is largest in case (2) from among the above-mentioned four cases. This is because the read mode in case (2) is different from that in case (1) and so the spatial frequency band for evaluation of the focus detection signal is low. Moreover, though case (2) has the read mode as case (4), the error specific to phase difference detection occurs in on-imaging surface phase difference AF, and accordingly the same or more error arises as compared with TV-AF. Further, in case (3), the absolute value of the BP correction value is smallest in view of both the read mode and the focus detection scheme. Although the first embodiment describes the structure of calculating the BP correction value in each of the above-mentioned four cases, correction may be performed only in a part depending on the magnitude of the BP correction value. In the first embodiment, correction is performed so that the correction error in the case where the absolute value of the BP correction value can be largest is reduced. With respect to permissible focus deviation calculated from a permissible circle of confusion, a permissible BP correction error can be set in view of other error factors. In the case where the correction amount calculated as the BP correction value is smaller than the permissible BP correction error, the calculation of the BP correction value may be omitted to reduce the computation complexity.

In the first embodiment, correction is performed so that the correction error in the case where the absolute value of the BP correction value can be largest is reduced. In the case where the absolute value of the BP correction value is large, the BP correction error cannot fall within the permissible range unless the correction is performed with favorable correction accuracy. Typically, the correction error tends to be larger when the amount to be corrected is larger. Hence, in this embodiment, correction value computation for obtaining a high-accuracy correction value is performed so that the correction error in the case (case (2)) where the absolute value of the BP correction value is largest is reduced.

The calculation methods of the BP correction values (BP1, BP2, BP3, and BP4) corresponding to the above-mentioned four cases are described below. The calculation method of the BP correction value BP2 in case (2) where the absolute value of the BP correction value is largest will be described first. First, in step S101, six correction value calculation coefficients are selected in accordance with five variables S, F, PD, D, and P of the above-mentioned six variables using the information obtained via the lens MPU 117 and the information obtained within the camera MPU 125. Note that the coefficients are stored in the RAM 125b in the camera MPU 125 beforehand. The selected six correction value calculation coefficients are expressed as C0(S, F, PD, D, P), C1(S, F, PD, D, P), C2(S, F, PD, D, P), C3(S, F, PD, D, P), C4(S, F, PD, D, P), and C5(S, F, PD, D, P).

The correction value calculation coefficients may be stored in the lens memory 118. In this case, the camera MPU 125 may transmit the information about the property of the focus detection signal to the lens MPU 117 by communication, as a result of which the lens MPU 117 transmits the six correction value calculation coefficients to the camera MPU 125 together with the information in the lens memory 118.

Next, the BP correction value BP2 corresponding to the image height H of the focus detection area, which is set as an image height (x, y) on the image sensor, is calculated by expression (2):

$$BP2 = C_0 + C_1 x^2 + C_2 y^2 + C_3 x^4 + C_4 x^2 y^2 + C_5 y^4 \qquad (2).$$

The BP correction value in case (2) is calculated according to expression (2). Since case (2) is the case where the absolute value of the BP correction value is largest as mentioned earlier, the correction error is likely to be large. Accordingly, the BP correction value BP2 is calculated with priority using an approximation of expression (2) so as to reduce the error for each type of variable for determining the BP correction value BP2.

The calculation methods of the BP correction values BP1, BP3, and BP4 respectively in cases (1), (3), and (4) will be described next. These BP correction values are calculated in a simple manner using the value of BP2 obtained by expression (2), since the BP correction amount is small as compared with case (2). When calculating the correction values, two offset components and one gain component are selected according to two variables S and F from among the above-mentioned six variables, for each of cases (1), (3), and (4). The selected offset components $O_1(S, F)$, $O_2(S, F)$, $O_3(S, F)$, $O_4(S, F)$, $O_5(S, F)$, and $O_6(S, F)$ and gain components $G_1(S, F)$, $G_2(S, F)$, and $G_3(S, F)$ are then used to perform adjustment. These offset components and gain components are either stored in the camera MPU 125, or stored in the lens memory 118, and the camera MPU 125 obtains the information by communication.

$$BP1 = (BP2 - O_1) \times G_1 + O_2 \qquad (3)$$

$$BP3=(BP2-O_3)\times G_2+O_4 \quad (4)$$

$$BP4=(BP2-O_5)\times G_3+O_6 \quad (5).$$

Although the first embodiment describes the case where adjustment is performed using the offset components $O_1$ to $O_6$ and the gain components $G_1$ to $G_3$ as values unchanged depending on the image height, variables different depending on the image height may be used with an approximation or the like.

As noted above, the main factors of the occurrence of the BP correction amount are the spatial frequency BP, the color BP, and the vertical/horizontal BP. In the case of the same imaging optical system, if the color used in the focus detection signal is the same, the amounts of the color BP and the vertical/horizontal BP are unchanged even when the focus detection method or the read mode of the image sensor 122 is different. The offset components are accordingly used to mainly adjust the error caused by these two factors. Meanwhile, the spatial frequency BP changes in amount depending on the spatial frequency band for evaluation of the focus detection signal, and so changes in value when the read mode of the image sensor 122 changes. The amount of the spatial frequency BP is larger when the pixel pitch increases or the frequency band for evaluation of the band-pass filter processed in the focus detection signal is lowered due to the difference of the read mode of the image sensor 122. Hence, the amount of the spatial frequency BP included in the BP correction value BP2 is reduced by multiplication by a value not greater than 1 in absolute value as a gain component, to calculate the BP correction values BP1, BP3, and BP4.

The method of accurately calculating the BP correction value BP3 from the BP correction value BP2 is described below with reference to FIG. 9. FIG. 9 shows the BP correction amounts of the BP correction value BP2 and BP correction value BP3. The BP correction value BP2 is represented as the sum of a vertical/horizontal BP2-1, a color BP2-2, and a spatial frequency BP2-3. The BP correction value BP3 is represented as the sum of a vertical/horizontal BP3-1, a color BP3-2, and a spatial frequency BP3-3.

While the focus detection scheme or the read mode of the image sensor 122 is different, the amount of the vertical/horizontal BP is substantially unchanged, so that the vertical/horizontal BP2-1 and the vertical/horizontal BP3-1 are substantially the same amount. FIG. 9 shows the case where, as the focus detection signal, the luminance signal Y is used in on-imaging surface phase difference AF and the G (green) signal is used in TV-AF. The color BP3-2 is therefore larger in value than the color BP2-2. Moreover, since the read mode of the image sensor 122 is different, with regard to the spatial frequency BP, the spatial frequency BP2-3 is larger in value than the spatial frequency BP3-3.

To calculate the BP correction value BP3 from the BP correction value BP2 in such a case, the offset component $O_3$ can be set to the value corresponding to the sum of the vertical/horizontal BP2-1 and the color BP 2-2. The gain component $G_2$ can be set to the value corresponding to the ratio of the spatial frequency BP3-3 to the spatial frequency BP2-3. Furthermore, the offset component $O_4$ can be set to the value corresponding to the sum of the vertical/horizontal BP3-1 and the color BP3-2. By use of these offset components and gain component, the BP correction value BP3 can be corrected with sufficiently high accuracy according to expression (4).

In the case where, for example, the color used for the focus detection signal is the same or the vertical/horizontal BP correction value is small, the two offset components used when calculating the BP correction values BP1, BP3, and BP4 may have the same values.

In step S102, the BP correction value corresponding to the focus detection method and read mode set in step S101 is calculated by the above-mentioned methods.

Since the BP correction values BP1, BP3, and BP4 are simply calculated in this way, the accuracy of the BP correction value is lower than that of BP2. However, given that the necessary BP correction amount is small, its influence on the focus detection accuracy is small, and focus detection with sufficiently high accuracy can be carried out. Moreover, the offset components and the gain components are the only information necessary for calculating the BP correction values BP1, BP3, and BP4, with it being possible to reduce the storage space for data and the BP correction value computation load.

Although the gain component is desirably used to calculate a smaller BP correction value by multiplication by a value not greater than 1, the BP correction value calculation method is not limited to this. In the case where the imaging situation is dark, for example, the S/N ratio of the focus detection signal deteriorates, and accordingly the spatial frequency band for evaluation of the focus detection signal may be lowered to improve the S/N ratio. In such a case, the spatial frequency BP increases in amount, and a value greater than 1 may be used as a gain component in multiplication for the correction.

Although the above describes the case where the calculation of the correction value is mainly performed by the camera MPU 125, the present invention is not limited to this. For example, the calculation of the correction value may be performed by the lens MPU 117. In this case, each type of information may be transmitted from the camera MPU 125 to the lens MPU 117, to calculate the BP correction value in the lens MPU 117. Then, in step S22 in FIG. 7A, the in-focus position transmitted from the camera MPU 125 may be corrected by the lens MPU 117 to drive the lens.

The first embodiment describes the case where the BP correction values BP1, BP3, and BP4 in cases (1), (3), and (4) are simply calculated using, as a reference correction value, the BP correction value in case (2) where the error caused by the property of the imaging optical system is most likely to occur. However, the present invention is not limited to this. For example, a reference correction value may be obtained for a predetermined combination from among the combinations of the plurality of read methods and the plurality of focus detection methods supported by the image capturing apparatus. In such a case, the BP correction values for the other combinations may be simply calculated using the offset components and the gain components as mentioned above.

Second Embodiment

The following describes a second embodiment of the present invention with reference to FIG. 10. The main difference from the first embodiment lies in that the focus detection scheme, the read mode of the image sensor, etc. are different between a plurality of types of camera bodies. In the first embodiment, the plurality of focus detection schemes and image sensor read modes are available in one type of camera body, and the focus detection result is corrected using the BP correction value corresponding to each focus detection scheme and image sensor read mode. In the second embodiment, BP correction can be performed in cameras that differ in the focus detection scheme or image sensor read mode.

The basic structure, focus detection scheme, focus detection process, and BP correction value calculation methods of the image capturing apparatus in the second embodiment are the same as those in the foregoing first embodiment, and so their description are omitted.

The following describes information communicated between the lens unit of the image capturing system and a plurality of types of removable camera bodies in the second embodiment. The plurality of types of camera bodies are hereafter referred to as camera bodies 120a, 120b, and 120c.

FIG. 10 shows the lens unit 100 and the removable camera bodies 120a, 120b, and 120c in the image capturing system. The lens memory 118 in the lens unit 100 stores the six correction value calculation coefficients ($C_0$ to $C_5$) used in expression (2) in the first embodiment and the offset components and gain components ($O_1$ to $O_4$, $G_1$, $G_2$) corresponding to the focus detection schemes and image sensor read modes, as coefficients for calculating the BP correction values.

It is assumed that the camera body 120a performs on-imaging surface phase difference AF in the second read mode. In addition, it is assumed that the camera body 120b performs on-imaging surface phase difference AF in the first read mode, and the camera body 120c performs TV-AF in the first read mode.

In the case where the lens unit 100 is attached to the camera body 120a, the camera MPU 125 in the camera body 120a obtains the correction value calculation coefficients ($C_0$ to $C_5$) by communication, upon calculating the BP correction value. The camera MPU 125 then calculates the BP correction value by expression (2) in the first embodiment.

In the case where the lens unit 100 is attached to the camera body 120b, the camera MPU 125 in the camera body 120b obtains the correction value calculation coefficients ($C_0$ to $C_5$) and the offset components and gain component ($O_1$, $O_2$, $G_1$) by communication, upon calculating the BP correction value. The camera MPU 125 then calculates and adjusts the BP correction value by expressions (2) and (3) in the first embodiment.

In the case where the lens unit 100 is attached to the camera body 120c, the camera MPU 125 in the camera body 120c obtains the correction value calculation coefficients ($C_0$ to $C_5$) and the offset components and gain component ($O_3$, $O_4$, $G_2$) by communication, upon adjusting the BP correction value. The camera MPU 125 then calculates the BP correction value by expressions (2) and (4) in the first embodiment.

Thus, even in the case where any of a plurality of types of camera bodies is attached to one lens unit, high-accuracy BP correction can be carried out by a relatively simple structure.

Although the foregoing first and second embodiments describe the case where the BP correction value is calculated depending on the combination of the read mode and the focus detection method, the BP correction value may be calculated depending on only the focus detection method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-114371, filed on Jun. 2, 2014 which is hereby incorporated by reference herein in its entirety.

What is claimed is:

1. An image capturing apparatus comprising:
a focus detection unit configured to detect, based on a signal output from an image sensor, a focus evaluation value for controlling an imaging optical system to be in an in-focus state using one of a plurality of different focus detection methods;
a correction unit configured to correct the focus evaluation value in accordance with the focus detection method used for the detection; and
a storage unit configured to store information for calculating a reference correction value for correcting a focus evaluation value detected using a predetermined focus detection method from among the plurality of different focus detection methods, and information for calculating, from the reference correction value, a correction value for correcting a focus evaluation value detected using a focus detection method other than the predetermined focus detection method from among the plurality of different focus detection methods,
wherein the correction unit is configured to calculate a correction value for correcting the focus evaluation value using the information stored in the storage unit, and correct the focus evaluation value using the calculated correction value.

2. The image capturing apparatus according to claim 1, wherein the information for calculating the reference correction value is information different between the plurality of focus detection methods depending on a property of the image sensor and a state of the imaging optical system during image capturing, and the information for calculating the correction value is information different between the plurality of focus detection methods depending on the state of the imaging optical system during image capturing.

3. The image capturing apparatus according to claim 2, wherein the predetermined focus detection method is a focus detection method in which a difference between a position of the imaging optical system controlled based on the focus evaluation value and a position of the imaging optical system in the case where an image formed by the signal output from the image sensor is in focus is most likely to occur.

4. The image capturing apparatus according to claim 1, wherein the correction unit is further configured to calculate the reference correction value based on an image height of a focus detection area subjected to focus detection.

5. The image capturing apparatus according to claim 2, wherein the property of the image sensor includes at least one of a pupil distance set in the image sensor and a pixel size of the image sensor.

6. The image capturing apparatus according to claim 2, wherein the state of the imaging optical system includes at least one of a focus control state, an aperture value, and an exit pupil distance.

7. The image capturing apparatus according to claim 1, wherein the image sensor includes a plurality of pixels each includes a plurality of photoelectric converters for one microlens and outputs signals for phase difference detection, and
the plurality of focus detection methods used in the focus detection unit include a focus detection method of a phase difference scheme performed based on the signals for phase difference detection.

8. The image capturing apparatus according to claim 1, wherein the plurality of focus detection methods used in the focus detection unit include a focus detection method of a contrast scheme performed based on a contrast of the signal obtained from the image sensor.

9. An image capturing apparatus comprising:
an image sensor readable at different resolutions;
a focus detection unit configured to detect, based on a signal output from the image sensor, a focus evaluation value for controlling an imaging optical system to be in an in-focus state using one of a plurality of different focus detection methods;
a correction unit configured to correct the focus evaluation value in accordance with a combination of a resolution during image capturing and the focus detection method used for the detection; and a storage unit configured to store information for calculating a reference correction value for correcting a focus evaluation value detected using a predetermined combination from among a plurality of combinations of the different resolutions and the plurality of different focus detection methods, and information for calculating, from the reference correction value, a correction value for correcting a focus evaluation value detected using a combination other than the predetermined combination from among the plurality of combinations of the different resolutions and the plurality of different focus detection methods, wherein the correction unit is configured to calculate a correction value for correcting the focus evaluation value using the information stored in the storage unit, and correct the focus evaluation value using the calculated correction value.

10. The image capturing apparatus according to claim 9, wherein the information for calculating the reference correction value is information different between the plurality of combinations depending on a property of the image sensor and a state of the imaging optical system during image capturing, and the information for calculating the correction value is information different between the plurality of combinations depending on the state of the imaging optical system during image capturing.

11. The image capturing apparatus according to claim 10, wherein the predetermined combination is a combination in which a difference between a position of the imaging optical system controlled based on the focus evaluation value and a position of the imaging optical system in the case where an image formed by the signal output from the image sensor is in the in-focus state is most likely to occur.

12. The image capturing apparatus according to claim 9, wherein the correction unit is further configured to calculate the reference correction value based on an image height of a focus detection area subjected to focus detection.

13. The image capturing apparatus according to claim 10, wherein the property of the image sensor includes at least one of a pupil distance set in the image sensor and a pixel size of the image sensor.

14. The image capturing apparatus according to claim 10, wherein the state of the imaging optical system includes at least one of a focus control state, an aperture value, and an exit pupil distance.

15. The image capturing apparatus according to claim 9, wherein the image sensor includes a plurality of pixels each includes a plurality of photoelectric converters for one microlens and outputs signals for phase difference detection, and
the plurality of focus detection methods used in the focus detection unit include a focus detection method of a phase difference scheme performed based on the signal for phase difference detection.

16. The image capturing apparatus according to claim 9, wherein the plurality of focus detection methods used in the focus detection unit include a focus detection method of a contrast scheme performed based on a contrast of the signal obtained from the image sensor.

17. An image capturing system comprising an imaging optical system and an image capturing apparatus, wherein the image capturing apparatus includes:
a focus detection unit configured to detect, based on a signal output from an image sensor, a focus evaluation value for controlling the imaging optical system to be in an in-focus state; and
a correction unit configured to correct the focus evaluation value in accordance with a focus detection method used for the detection,
the imaging optical system includes
a storage unit configured to store information for calculating a reference correction value for correcting a focus evaluation value detected using a predetermined focus detection method from among a plurality of different focus detection methods, and information for calculating, from the reference correction value, a correction value for correcting a focus evaluation value detected using a focus detection method other than the predetermined focus detection method from among the plurality of different focus detection methods,
wherein the imaging optical system outputs, from among the information stored in the storage unit, information corresponding to the focus detection method used for the detection by the focus detection unit, to the image capturing apparatus, and
the correction unit is configured to calculate a correction value for correcting the focus evaluation value using the information output from the imaging optical system, and correct the focus evaluation value using the calculated correction value.

18. An image capturing system comprising an imaging optical system and an image capturing apparatus, wherein the image capturing apparatus includes:
an image sensor readable at different resolutions;
a focus detection unit configured to detect,
based on a signal output from the image sensor, a focus evaluation value for controlling the imaging optical system to be in an in-focus state; and
a correction unit configured to correct the focus evaluation value in accordance with a resolution during image capturing and a focus detection method used for the detection,
the imaging optical system includes
a storage unit configured to store information for calculating a reference correction value for correcting a focus evaluation value detected using a predetermined combination from among a plurality of combinations of different resolutions and plurality of different focus detection methods, and information for calculating, from the reference correction value, a correction value for correcting a focus evaluation value detected using a combination other than the predetermined combination from among the plurality of combinations of different resolutions and plurality of different focus detection methods,
wherein the imaging optical system outputs, from among the information stored in the storage unit, information corresponding to the combination used in the image capturing apparatus, to the image capturing apparatus, and
the correction unit is configured to calculate a correction value for correcting the focus evaluation value using the information output from the imaging optical system, and correct the focus evaluation value using the calculated correction value.

19. A control method of an image capturing apparatus, comprising:
detecting, based on a signal output from an image sensor, a focus evaluation value for controlling an imaging optical system to be in an in-focus state using one of a plurality of different focus detection methods;
obtaining information corresponding to the focus detection method used for the detection of the focus evaluation value from a storage unit storing information for calculating a reference correction value for correcting a focus evaluation value detected using a predetermined focus detection method from among the plurality of different focus detection methods and information for calculating, from the reference correction value, a correction value for correcting a focus evaluation value detected using a focus detection method other than the predetermined focus detection method from among the plurality of different focus detection methods;

calculating a correction value for correcting the focus evaluation value using the obtained information; and correcting the detected focus evaluation value using the calculated correction value.

20. The control method of an image capturing apparatus according to claim 19, wherein the information is obtained from the storage unit included in the imaging optical system.

21. A control method of an image capturing apparatus, comprising:

detecting, based on a signal output from an image sensor readable at different resolutions, a focus evaluation value for controlling an imaging optical system to be in an in-focus state using one of a plurality of different focus detection methods;

obtaining information corresponding to a combination used for the detection of the focus evaluation value from a storage unit storing information for calculating a reference correction value for correcting a focus evaluation value detected using a predetermined combination from among a plurality of combinations of the different resolutions and the plurality of different focus detection methods and information for calculating, from the reference correction value, a correction value for correcting a focus evaluation value detected using a combination other than the predetermined combination from among the plurality of combinations of the different resolutions and the plurality of different focus detection methods;

calculating a correction value for correcting the focus evaluation value using the obtained information; and correcting the detected focus evaluation value using the calculated correction value.

22. The control method of an image capturing apparatus according to claim 21, wherein the information is obtained from the storage unit included in the imaging optical system.

* * * * *